(12) United States Patent
Lin

(10) Patent No.: US 10,031,736 B2
(45) Date of Patent: Jul. 24, 2018

(54) AUTOMATIC SYSTEM SOFTWARE INSTALLATION ON BOOT

(71) Applicant: Quanta Computer Inc., Taoyuan (TW)

(72) Inventor: Wen-Hua Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 14/869,033

(22) Filed: Sep. 29, 2015

(65) Prior Publication Data

US 2017/0090896 A1   Mar. 30, 2017

(51) Int. Cl.
| | | |
|---|---|---|
| *G06F 9/445* | (2018.01) | |
| *G06F 8/61* | (2018.01) | |
| *G06F 8/65* | (2018.01) | |
| *G06F 9/4401* | (2018.01) | |

(52) U.S. Cl.
CPC ............... *G06F 8/61* (2013.01); *G06F 8/65* (2013.01); *G06F 9/4406* (2013.01); *G06F 9/44505* (2013.01)

(58) Field of Classification Search
CPC ..................................... G06F 8/61; G06F 8/65
USPC ................... 717/168, 174, 176, 178
See application file for complete search history.

(56) References Cited

U.S. PATENT DOCUMENTS

| | | | | | |
|---|---|---|---|---|---|
| 6,066,182 | A * | 5/2000 | Wilde | ............... | G06F 8/61 709/220 |
| 6,934,956 | B1 * | 8/2005 | Allen | ............... | G06F 8/60 713/1 |
| 8,090,810 | B1 * | 1/2012 | Insley | ............... | G06F 11/3006 709/223 |
| 8,495,626 | B1 * | 7/2013 | Hanes | ............... | G06F 8/60 717/178 |
| 8,713,551 | B2 * | 4/2014 | Douglas | ............... | G06F 11/2097 714/12 |
| 2005/0229173 | A1 * | 10/2005 | Mihm | ............... | G06F 8/65 717/171 |
| 2006/0155838 | A1 * | 7/2006 | Wu | ............... | G06F 9/4416 709/223 |
| 2010/0211943 | A1 * | 8/2010 | Chu | ............... | G06F 8/61 717/174 |
| 2012/0317224 | A1 * | 12/2012 | Caldwell | ............... | H04W 24/00 709/217 |

(Continued)

FOREIGN PATENT DOCUMENTS

| | | | |
|---|---|---|---|
| CN | 103744710 A | * | 4/2014 |
| TW | 201523447 A | | 6/2015 |

OTHER PUBLICATIONS

Taiwanese Office Action 10521068010 dated Aug. 30, 2016 w/ First Office Action Summary in English.

*Primary Examiner* — Phillip H Nguyen
(74) *Attorney, Agent, or Firm* — Nixon Peabody LLP; Eduardo J. Quiñones; Zhou Lu

(57) ABSTRACT

A method for automatically installing system software by a server includes obtaining, by a controller of the server, a configuration file for installing the system software to the server and then storing the configuration file to a storage of the server. The method includes booting up the server, after storing the configuration file, and retrieving the stored answer file from the storage. The method further includes installing the system software to the server based on the configuration file, without generating a new configuration file, in response to booting up the server.

13 Claims, 4 Drawing Sheets

(56) References Cited

U.S. PATENT DOCUMENTS

| | | | |
|---|---|---|---|
| 2013/0152074 A1* | 6/2013 | Yeh | G06F 8/61 717/178 |
| 2013/0254759 A1* | 9/2013 | Xu | G06F 8/61 717/174 |
| 2014/0172924 A1* | 6/2014 | Lumens | G06F 17/3007 707/812 |
| 2014/0324944 A1* | 10/2014 | Christopher | H04L 67/025 709/203 |
| 2015/0149989 A1* | 5/2015 | Lu | G06F 8/65 717/170 |
| 2015/0365781 A1* | 12/2015 | Han | G06F 8/65 455/41.2 |
| 2017/0201419 A1* | 7/2017 | Garcia | H04W 8/26 |

\* cited by examiner

AUTOMATIC SYSTEM SOFTWARE INSTALLATION ON BOOT

BACKGROUND

Field

This application relates to managed computer systems, and more particularly to a system and method for automatically installing system software to a server.

Background

Server systems are available in a vast array of hardware configurations to meet varying needs of data centers. Operating systems (OS) are essential system software for servers and other computing devices. The OS manages hardware and software resources and provide common services for applications. The installation of an OS to a server often requires significant time and resources.

Currently, installation of an OS to a server requires an administrator to choose from various configuration options. For example the administrator may wish to choose between different configurations for Redundant Array of Independent Disks (RAID), device drivers, utilities, or other installation options. Commonly, the server must first boot up and run certain software (referred to as a deployment agent), to generate a configuration file (referred to as an answer file), by receiving user input. The configuration file is a file that contains setting definitions and values to use during OS installation. In an answer file, you specify various setup options, including how to partition disks, the location of the Windows image to install, and the product key to apply. You can also specify values that apply to the Windows installation, such as the names of user accounts, display settings, and Internet Explorer Favorites. Then, the server must reboot then install the OS using the configuration file generated by the deployment agent.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In some implementations, a method is provided for automatically installing system software by a server. A controller of the server can obtain a configuration file for installing the system software to the server. The server can store the configuration file to a storage of the server. The server can boot up after storing the configuration file. The server can retrieve the stored answer file from the storage. The server can install the system software based on the configuration file, without generating a new configuration file, in response to booting up the server.

In some implementations, a server can automatically install system software. The server can include a storage and a controller in communication with the storage and storing instructions which, when executed, cause the server to perform operations. The operations can include obtaining a configuration file for installing the system software to the server and storing the configuration file to the storage. The operations can include booting up the server, after storing the configuration file and retrieving the stored answer file from the storage. The operations can further include installing the system software to the server based on the configuration file, without generating a new configuration file, in response to booting up the server.

BRIEF DESCRIPTION OF THE DRAWINGS

These and other sample aspects of the present technology will be described in the detailed description and the appended claims that follow, and in the accompanying drawings, wherein:

DETAILED DESCRIPTION

The subject disclosure provides techniques for automatically installing system software to a server on boot. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects.

An administrator of a data center may wish to install a new operation system or other system software to one or more servers in the data center. For example, installing a new OS is common when adding a new server to the data center, when a server receives significant hardware changes, or when a new OS is released. The installation of OS to servers often requires significant time and resources. Traditionally, to install an OS or other system software to a server requires multiple boot ups of the server.

Figure 1:
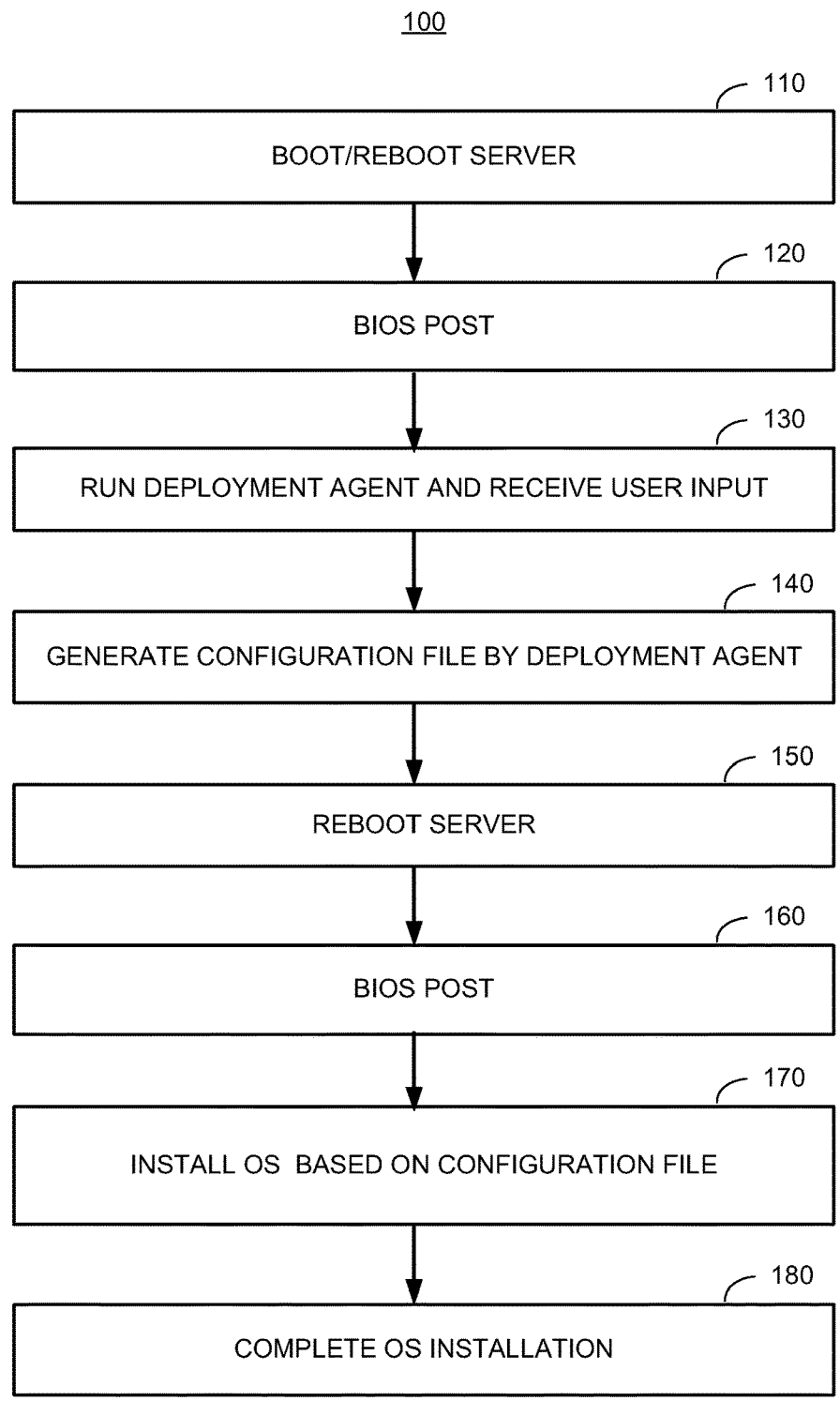
FIG. 1 illustrates a method in the prior art for installing an operating system to a server.

FIG. 1 illustrates a method 100 in the prior art for installing an OS to a server. At step 110, an administrator of a server boots or reboots the server. The install process of method 100 cannot begin until the server is boot or reboot.

At step 120, a Basic Input/Output System (BIOS) of the server can perform a power-on self-test (POST). A BIOS software program is stored on a BIOS chip located on a motherboard of the server. The BIOS stores firmware executed when the computer system is first powered on. The BIOS typically recognizes, initializes, and tests hardware present in a given computing system. The BIOS then gives control of the computer system to an OS.

The BIOS begins POST whenever the server is powered on (i.e., boot up) or reset (i.e., reboot). The POST process can verify and test functionality of various hardware components such as central processing unit (CPU) registers, hard disk drives, optical reading devices, cooling devices, memory modules, expansion cards and the like. The BIOS also prepares a system environment required for running an OS. For example, the BIOS can address and allocate an area in the memory in to store the OS. The BIOS can then give control of the computer system to the OS.

At step 130, the BIOS can run a deployment agent. The deployment agent is a software program that prepares the server for installing the OS. The deployment agent is typically a memory-resident, minimal OS that can initialize hard disk drives (HDDs) and transfer disk images and files. The deployment agent allows an administrator to choose between different configurations options for Redundant Array of Independent Disks (RAID), device drivers, utilities, or other installation options for the OS. The deployment agent can provide a user interface to allow the administrator to input choices for the different configurations.

At step 140, the deployment agent generates a configuration file, sometimes referred to as an answer file. The configuration file saves the choices for the configuration options that the administrator input to the deployment agent.

At step 150, the server is rebooted. At step 160, the BIOS begins POST again. At step 170, the OS can be installed using the configuration choices saved in the configuration file. At step 180, installation of the OS completes.

The method 100 requires the server to be boot/reboot twice, once to run the deployment agent to generate the configuration file, and again to install the OS using the configuration file.

Figure 2:
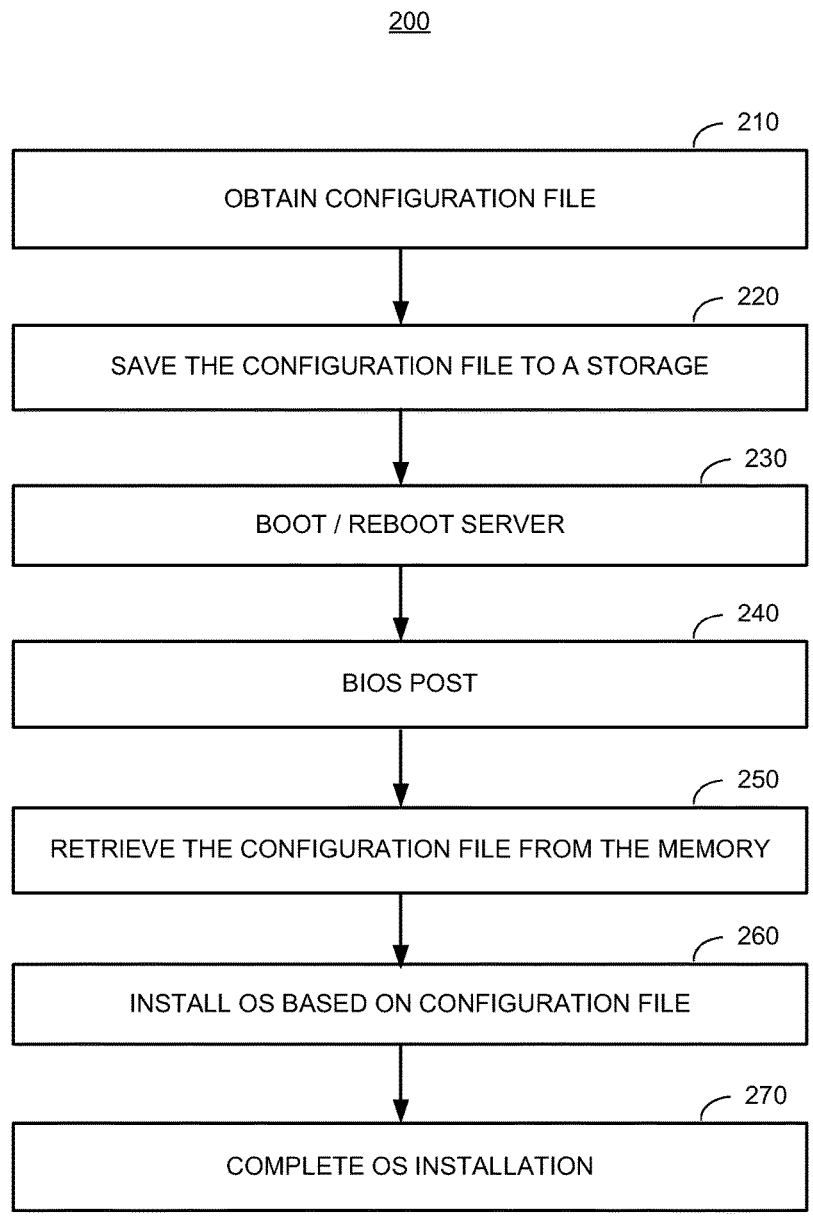
FIG. 2 illustrates an example method for automatically installing system software to a server on boot.

FIG. 2 illustrates an example method 200 for automatically installing system software to a server on boot. The system software can be, for example, an OS or firmware. Unlike the method 100 described in FIG. 1, the method 200 does not requires the server to boot or reboot to begin installing the OS. The method 200 allows the install process to begin in powered down state without booting the server or in a powered on state without rebooting the server.

At step 210, the server can obtain a configuration file, sometimes referred to as an answer file. The configuration file saves the installation option choices. The configuration file can differ depending on whether the system file to be installed is an OS or firmware.

In some implementations, the server can be in a powered down or shut off state when obtaining the configuration file. In some other implementations, the server can be in a powered on state. For example, the server can be running an OS when obtaining the configuration file.

For example, the server may run an install application to obtain the configuration file. The install application can be, for example, web-based application with a web user interface for receiving user input. A web-based application is any program that can be rendered by a web browser. For example, the application can be run by an OS while the server is in a powered on state.

In some implementations, the install application can be run by a management controller, such as for example a baseboard management controller (BMC). The install application can be run even while the server is in a powered off state.

In some implementations, a server can generate the configuration file from user (e.g., an administrator) input. The server can receive user input to choose between different configurations options for Redundant Array of Independent Disks (RAID), device drivers, utilities, or other installation options for installing the system software (e.g., an OS or firmware). The server can generate the configuration file based on the user input received.

Unlike the method 100 described in FIG. 1, the method 200 also allows the server to receive a prior generated configuration file. In some implementations, the server can receive or import the configuration file instead of generating it from user input. For example, the configuration file can be received over a network from an administrator device. The network can be, for example, a local area network (LAN) such as Ethernet, Wi-Fi, or Bluetooth, or a wide area network such as the Internet. The administrator device can be, for example, a computer or mobile device connected to the network for managing the installation of the system software.

At step 220, the server can save the configuration file to a storage of the server. In some implementations, the install application can save the configuration file to the storage. For example, the storage can be a non-volatile random-access memory (NVRAM), a synchronous dynamic random access memory (SDRAM), an IPMI memory, or other similar device for storing information. In some implementations, the storage can be accessible by the management controller even while the server is in a powered off state.

In some implementations, the server can use an Intelligent Platform Management Interface (IPMI) command (e.g., an IPMI OEM SET command) to store the configuration file to the storage. IPMI is a set of specifications for an autonomous computer subsystem that manages and monitors a computer system's central processing unit (CPU), firmware, and OS, and for out-of-band management and monitoring by system administrators. For example, install application can send the IPMI command to a baseboard management controller (BMC) of the server to store the configuration file to the storage.

At step 230, the server can boot or reboot. For example, if the server was previously powered down, the server can boot up. If the server was previously already powered on, the server can reboot. In some implementations, the install application can boot or reboot the server.

At step 240, the BIOS of the server can perform POST. The POST process can verify and test functionality of various hardware components such as central processing unit (CPU) registers, hard disk drives, optical reading devices, cooling devices, memory modules, expansion cards and the like. The BIOS can also prepare a system environment required for running an OS. In some implementations, the BIOS can run an OS installer from a storage device such as a HDD, a solid state drive (SSD), a removable flash drive, an optical disk (e.g., compact disk, digital versatile disc, Blue-ray Disc, etc.), or other similar storage.

At step 250, the server can retrieve the configuration file from the storage. In some implementations, the OS installer can retrieve the configuration file from the memory. For example, the server can use an IPMI OEM GET command to retrieve the configuration file from the memory.

At step 260, the server can install the system software based on the installation option choices from the configuration file. In some implementations, the OS installer installs the OS based on the configuration file. The server can install the system software using system software installation files/image. For example, the system software installation files/image can be retrieved from a storage device such as a HDD, a solid state drive (SSD), a removable flash drive, an optical disk (e.g., compact disk, digital versatile disc, Blue-ray Disc, etc.), or other similar storage. In another example the system software installation files/image can be retrieved from a network such as a LAN (e.g., Ethernet, Wi-Fi, Bluetooth, etc.) or a wide area network such as the Internet.

At step 270, the server completes the system software installation. The method 200 can perform the OS installation with one fewer boot/reboot than the method 100 described in FIG. 1, saving significant uptime for the server and work time for the administrator.

Figure 3:
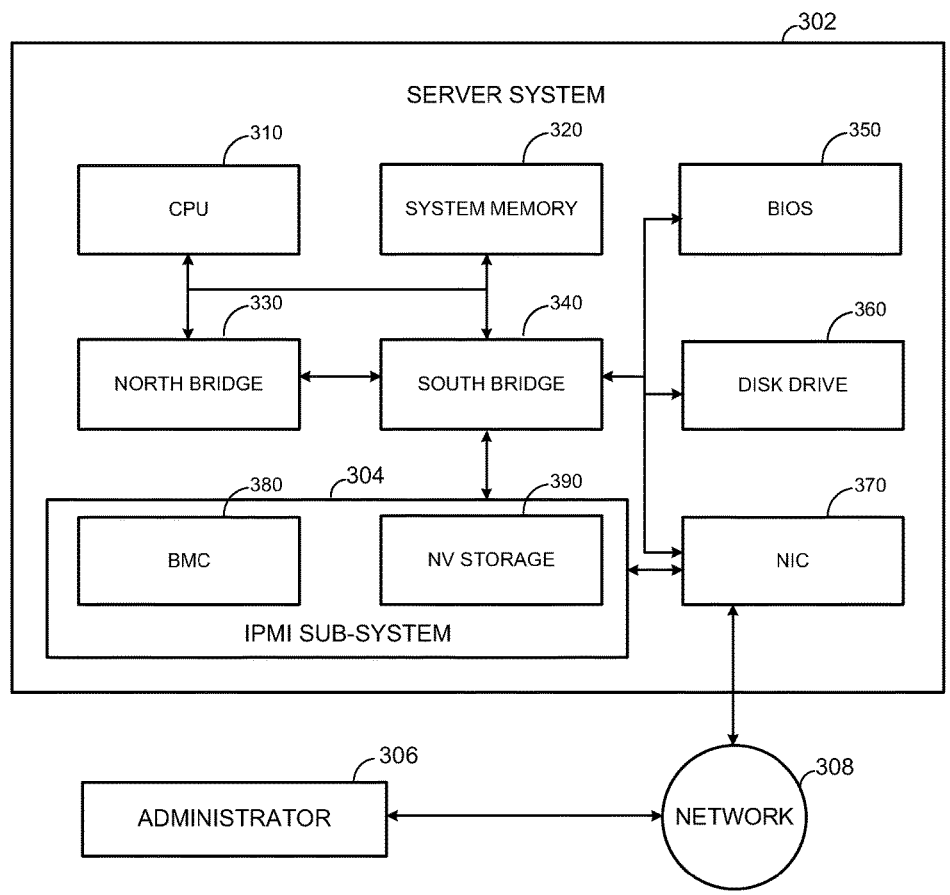
FIG. 3 illustrates a block diagram of an example server system for automatically installing system software to a server on boot.

FIG. 3 illustrates a block diagram 300 of an example server system 302 for automatically installing system software to a server on boot. The system software can be, for example, an OS or firmware. The server system 302 can include a central processing unit (CPU) 310, system memory 320, a north bridge 330, a south bridge 340, a BIOS 350, a disk drive 360, a network interface controller (NIC) 370, and an IPMI sub-system 304. In some instances, the northbridge 460 and the southbridge 470 can be combined into a single die, such as for example into a platform controller hub (PCH).

The IPMI sub-system 304 can include a baseboard management controller (BMC) 380, a non-volatile storage 390, and other management controllers (not shown) distributed among different system modules that are referred to as satellite controllers. The IPMI sub-system 304 can operate independent of the rest of the server system 302 and can function even when the server system 302 is powered down or shut off. The IPMI sub-system 304 can provide a way to manage the server system 302 that is powered down or is otherwise unresponsive. For example, the IPMI sub-system 304 and the NIC 390 can operate on standby power or in a low-power mode while the server system 302 is shut down.

The satellite controllers within the same chassis connect to the BMC via Intelligent Platform Management Bus (IPMB), an implementation of Inter-Integrated Circuit (IIC or I²C) protocol. The IIC protocol features a multi-master, multi-slave, single-ended, serial computer bus that uses a Serial Data Line and a Serial Clock Line with a 7-bit or a 10-bit address space.

The BMC 380 can include a microcontroller that manages interfaces between system management software and platform hardware. In some implementations, each BMC 380 can manage hardware components within the server 302, such as processors, memory, storage devices, PSUs, fans, boards, etc.

In some implementations, the BMC 380 can communicate with the various server components that the BMC 380 manages using the IPMI protocol. IPMI is a set of specifications for an autonomous computer subsystem that manages and monitors a computer system's CPU, firmware, and OS, and for out-of-band management and monitoring by system administrators. The BMC 380 can connect to the various server components (e.g., southbridge 340 or NIC 370) using any bus interface such as the system management bus (SMBus), RS-232 serial bus, IIC protocol, Ethernet, IPMB, low-pin count (LPC) bus, etc. The IIC protocol features a multi-master, multi-slave, single-ended, serial computer bus that uses a Serial Data Line and a Serial Clock Line with a 7-bit or a 10-bit address space. The SMBus protocol features a single-ended, two-wire bus derived from IIC protocol and uses IIC hardware and IIC addressing. The IPMB is an IIC based serial bus for connecting various boards within the server.

The BMC 380 can connect to a network 308 using the NIC 370. The NIC 370 of the server 302 can include computer hardware components that allow a computing device to communicate over the network 308. The NIC 370 can connect to an administrator device 306 through the network 308. The network 308 can be, for example, a local area network (LAN) such as Ethernet, Wi-Fi, or Bluetooth, or a wide area network such as the Internet. The network 308 can be a telecommunications network that allows network nodes to exchange data along network links. For example, the network 308 can be an Ethernet, a type of wired LAN protocol described by a set of standards together called IEEE 802.3. The administrator device 306 can be a device that can send command or inputs to the BMC 380 as well as receive information from the BMC 380. For example, the administrator device 306 can be a computer or mobile device connected to the network 308 for managing the installation of the system software.

The IPMI sub-system 304 can include a non-volatile storage 390 for storing information, which can include a System Event Log (SEL), a Sensor Data Record (SDR) Repository, and Field Replaceable Units (FRUs).

The server system 302 can obtain a configuration file, sometimes referred to as an answer file. The configuration file saves the installation option choices. The configuration file can differ depending on whether the system file to be installed is an OS or firmware.

In some implementations, the server system 302 can be in a powered down or shut off state when obtaining the configuration file. For example, the IPMI sub-system 304 and the NIC 370 can operate on standby power or in a low-power mode while the server system 302 is shut down. The BMC 380 of the IPMI sub-system 304 can receive the configuration file from the administrator device 306 over the network 308. In some other implementations, the server system 302 can be in a powered on state. For example, the server system 302 can be running an OS when obtaining the configuration file.

For example, the server system 302 may run an install application to obtain the configuration file. The install application can be, for example, web-based application with a web user interface for receiving user input. A web-based application is any program that can be rendered by a web browser. For example, the application can be run by an OS while the server system 302 is in a powered on state. In another example, the install application can be run by the BMC 380 even while the server system 302 is in a powered off state.

In some implementations, a server system 302 can generate the configuration file from user (e.g., an administrator 306) input. The server system 302 can receive user input to choose between different configurations options for Redundant Array of Independent Disks (RAID), device drivers, utilities, or other installation options for installing the system software (e.g., an OS or firmware). The server system 302 can generate the configuration file, sometimes referred to as an answer file, based on the user input received. For example, the BMC 380 can receive user input from the administrator device 306 over the network 308 for various configuration options and generate the configuration file.

In some implementations, the server system 302 can receive or import the configuration file instead of generating it from user input. For example, the configuration file can be received over the network 308 from the administrator device 306. In another example, the configuration file can be retrieved from a storage device such as a NVRAM, a SDRAM, an IPMI memory, or other similar device for storing information. In some implementations, the storage can be accessible by the BMC even while the server is in a powered off state.

After obtaining the configuration file, the server system 302 can save the configuration file to a storage device of the server system 302. For example, the install application can save the configuration file to the storage. The storage device can be a NVRAM, a SDRAM, an IPMI memory, or other similar device for storing information. For example, the storage device can be the non-volatile storage 390 of the IPMI sub-system 380.

In some implementations, the server system 302 can use an IPMI command (e.g., a IPMI OEM SET command) to store the configuration file to the storage device. For example, the install application can send the IPMI OEM SET command to the BMC 380 of the IPMI sub-system 304 to store the configuration file to the non-volatile storage 390.

After saving the configuration file to the storage device, the server system 302 can then boot or reboot. For example, if the server system 302 was previously powered down, the server system 302 can boot up. If the server system 302 was previously already powered on, the server system 302 can reboot. In some implementations, the install application can boot or reboot the server system 302.

After booting up, the BIOS 350 of the server can perform POST. The BIOS 350 can store firmware executed when the server system 302 is first powered on. The POST process can verify and test functionality of various hardware components such as central processing unit (CPU) registers, hard disk drives, optical reading devices, cooling devices, memory modules, expansion cards and the like. The BIOS 350 can also prepare a system environment required for running an OS. In some implementations, the BIOS 350 can run an OS installer from a storage device such as a HDD, a solid state drive (SSD), a removable flash drive, an optical disk (e.g., compact disk, digital versatile disc, Blue-ray Disc, etc.), or other similar storage.

After the BIOS 350 performs POST, the server system 302 can retrieve the configuration file from the storage device. In some implementations, the OS installer can retrieve the configuration file from the storage device. For example, the server system 302 can use an IPMI OEM GET command to retrieve the configuration file from the storage device. For example, the install application can send the IPMI OEM GET command to the BMC 380 of the IPMI sub-system 304 to retrieve the configuration file from the non-volatile storage 390.

After retrieving the configuration file, the server device 302 can install the system software based on the installation option choices from the configuration file. In some implementations, the OS installer installs the OS based on the configuration file. The server system 302 can install the system software using system software installation files/image. For example, the system software installation files/image can be retrieved from the disk drive 360. In another example the system software installation files/image can be retrieved from the network 308 such as a LAN (e.g., Ethernet, Wi-Fi, Bluetooth, etc.) or a wide area network such as the Internet.

Figure 4:
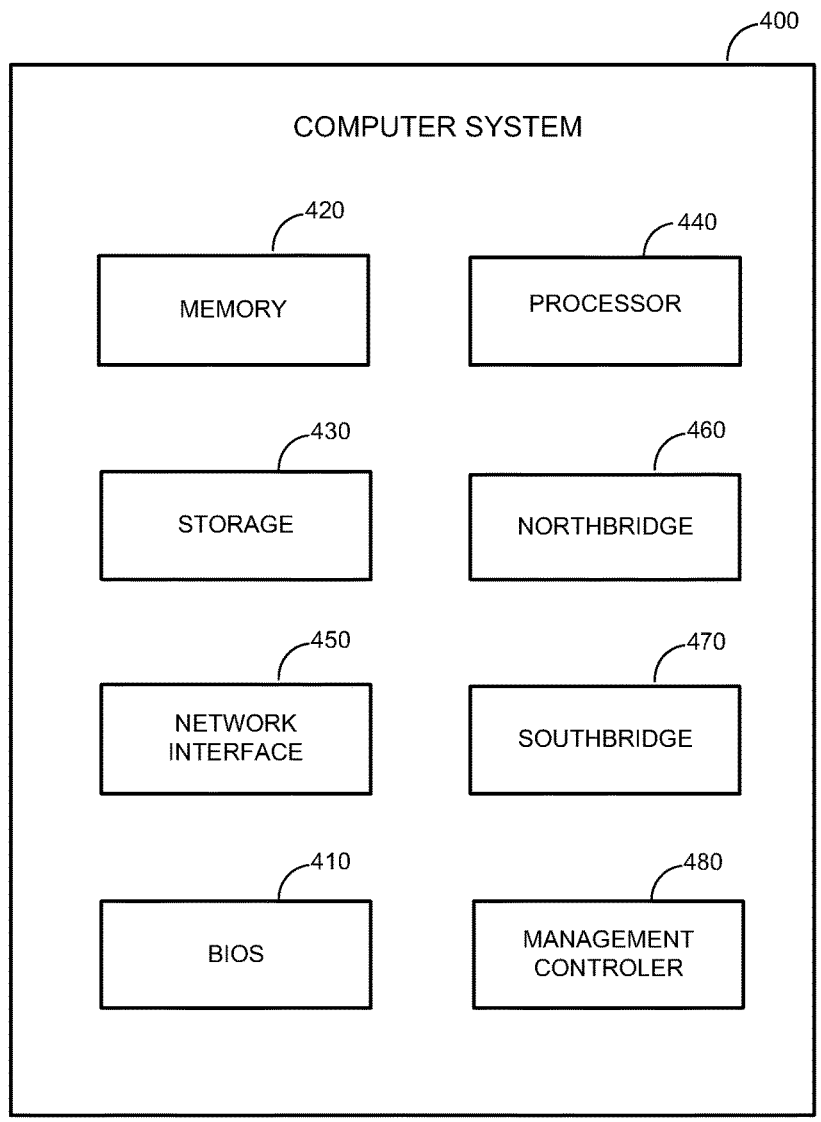
FIG. 4 illustrates a block diagram of an example computer system.

FIG. 4 illustrates a block diagram of an example computer system 400. The computer system 400 can include a processor 440, a network interface 450, a management controller 480, a memory 420, a storage 430, a BIOS 410, a northbridge 460, and a southbridge 470. In some instances, the northbridge 460 and the southbridge 470 can be combined into a single die, such as for example into a platform controller hub (PCH).

The computer system 400 can be, for example, a server (e.g., a server in a server rack of a data center) or a personal computer. The processor (e.g., central processing unit (CPU)) 440 can be a chip on a motherboard that can retrieve and execute programming instructions stored in the memory 420. The processor 440 can be a single CPU with a single processing core, a single CPU with multiple processing cores, or multiple CPUs. One or more buses (not shown) can transmit instructions and application data between various computer components such as the processor 440, memory 420, storage 430, and networking interface 450.

The memory 420 can include any physical device used to temporarily or permanently store data or programs, such as various forms of random-access memory (RAM). The storage 430 can include any physical device for non-volatile data storage such as a HDD or a flash drive. The storage 430 can have a greater capacity than the memory 420 and can be more economical per unit of storage, but can also have slower transfer rates.

The BIOS 410 can include a Basic Input/Output System or its successors or equivalents, such as an Extensible Firmware Interface (EFI) or Unified Extensible Firmware Interface (UEFI). The BIOS 410 can include a BIOS chip located on a motherboard of the computer system 400 storing a BIOS software program. The BIOS 410 can store firmware executed when the computer system is first powered on along with a set of configurations specified for the BIOS 410. The BIOS firmware and BIOS configurations can be stored in a non-volatile memory (e.g., NVRAM) or a ROM such as flash memory. Flash memory is a non-volatile computer storage medium that can be electronically erased and reprogrammed.

The BIOS 410 can be loaded and executed as a sequence program each time the computer system 400 is started. The BIOS 410 can recognize, initialize, and test hardware present in a given computing system based on the set of configurations. The BIOS 410 can perform self-test, such as a Power-on-Self-Test (POST), on the computer system 400. This self-test can test functionality of various hardware components such as hard disk drives, optical reading devices, cooling devices, memory modules, expansion cards and the like. The BIOS 410 can address and allocate an area in the memory 420 in to store an OS. The BIOS 410 can then give control of the computer system to the OS.

The BIOS 410 of the computer system 400 can include a BIOS configuration that defines how the BIOS 410 controls various hardware components in the computer system 400. The BIOS configuration can determine the order in which the various hardware components in the computer system 400 are started. The BIOS 410 can provide an interface (e.g., BIOS setup utility) that allows a variety of different parameters to be set, which can be different from parameters in a BIOS default configuration. For example, a user (e.g., an administrator) can use the BIOS 410 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 480 can be a specialized microcontroller embedded on the motherboard of the computer system. For example, the management controller 480 can be a baseboard management controller (BMC). The management controller 480 can manage the interface between system management software and platform hardware. Different types of sensors built into the computer system can report to the management controller 480 on parameters such as temperature, cooling fan speeds, power status, OS status, etc. The management controller 480 can monitor the sensors and have the ability to send alerts to an administrator via the network interface 450 if any of the parameters do not stay within preset limits, indicating a potential failure of the system. The administrator can also remotely communicate with the management controller 480 to take some corrective action such as resetting or power cycling the system to restore functionality.

In some instances, the northbridge 460 and the southbridge 470 can be combined into a single die, such as for example into a PCH. The northbridge 460 can be a chip on the motherboard that can be directly connected to the processor 440 or can be integrated into the processor 440. The northbridge 460 and the southbridge 470, manage communications between the processor 440 and other parts of the motherboard. The northbridge 460 can manage tasks that require higher performance than the southbridge 470. The northbridge 460 can manage communications between the processor 440, the memory 420, and video controllers (not shown). In some instances, the northbridge 460 can include a video controller.

The southbridge 470 can be a chip on the motherboard connected to the northbridge 460, but unlike the northbridge 460, need not be directly connected to the processor 440. The southbridge 470 can manage input/output functions, such as Universal Serial Bus (USB), audio, serial, BIOS, Serial Advanced Technology Attachment (SATA), Peripheral Component Interconnect (PCI) bus, PCI eXtended (PCI-X) bus, PCI Express bus, ISA bus, SPI bus, eSPI bus, SMBus, of the computer system 400. The southbridge 470 can connect to or can include within the southbridge 470 the management controller 470, Direct Memory Access (DMAs) controllers, Programmable Interrupt Controllers (PICs), and a real-time clock. In some instances, the southbridge 470 can directly connect to the processor 440, such as in the case where the northbridge 460 is integrated into the processor 440.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal In the alternative, the processor and the storage medium can reside as discrete components in a user terminal In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

The invention claimed is:

1. A method for automatically installing system software by a server system, comprising:
   in a powered down state without booting the server system, connecting to an administrator device over a network by a baseboard management controller of the server system;
   downloading a configuration file for installing the system software to the server system and storing the configuration file to a storage of the server system, application(s) on the baseboard management controller capable of running even while the server system is in the powered down state;
   while in the powered down state, executing at least one Intelligent Platform Management Interface (IPMI) Original Equipment Manufacturer (OEM) SET command received from the administrator device to store the configuration file;
   performing a boot up process at the server system, after storing the configuration file; and
   in response to performing the boot up process, retrieving the configuration file from the storage and installing the system software to the server based on the configuration file, wherein retrieving the configuration file comprises executing at least one IPMI OEM GET command received from the administrator device to the baseboard management controller to retrieve the configuration file.

2. The method of claim 1, wherein obtaining the configuration file occurs while the server system is running an operating system.

3. The method of claim 1, wherein the configuration file is for installing an operating system.

4. The method of claim 1, wherein the configuration file is for installing firmware.

5. A server system, comprising:
   a storage; and
   a baseboard management controller in communication with the storage and storing instructions which, when executed, cause the server system to perform operations comprising:
   in a powered down state without booting the server system, connecting to an administrator device over a network;

downloading a configuration file for installing a system software to the server system utilizing a baseboard management controller; and storing the configuration file to the storage, application(s) on the controller capable of running even while the server system is in the powered down state;

while in the powered down state, executing at least one Intelligent Platform Management Interface (IPMI) Original Equipment Manufacturer (OEM) SET command received from the administrator device to store the configuration file;

performing a boot up process at the server system after storing the configuration file; and in response to performing the boot up process, retrieving the configuration file from the storage and installing the system software to the server system based on the configuration file, wherein retrieving the configuration file comprises executing at least one IPMI OEM GET command received from the administrator device to the baseboard management controller to retrieve the configuration file.

6. The method of claim 1, further comprising:

receiving a user input to choose between different configuration options for Redundant Array of Independent Disks (RAID), device drivers, and utilities; and generating the configuration file based upon the user input and retrieved configuration file from the storage.

7. The server system of claim 5, wherein obtaining the configuration file occurs while the server system is running an operating system.

8. The server system of claim 5, wherein the configuration file is for installing an operating system.

9. The server system of claim 5, wherein the configuration file is for installing firmware.

10. A non-transitory computer readable storage medium including instructions that, when executed by at least one processor of a system, cause the system to perform operations comprising:

connecting to an administrator device over a network, by a baseboard management controller of a server system;

downloading a configuration file for installing a system software to the server system, in a powered down state without booting the server system, and storing the configuration file to a storage of the server system, application(s) on the baseboard management controller capable of running even while the server system is in the powered down state;

while in the powered down state, executing at least one Intelligent Platform Management Interface (IPMI) Original Equipment Manufacturer (OEM) SET command received from the administrator device to store the configuration file;

performing a boot up process at the server system after storing the configuration file; and retrieving the configuration file from the storage and installing the system software to the server system based on the configuration file, in response to performing the boot up process, wherein retrieving the configuration file comprises executing at least one IPMI OEM GET command received from the administrator device to the baseboard management controller to retrieve the configuration file.

11. The non-transitory computer readable medium of claim 10, wherein obtaining the configuration file occurs while the server system is running an operating system.

12. The non-transitory computer readable medium of claim 10, wherein the configuration file is for installing an operating system.

13. The non-transitory computer readable medium of claim 10, wherein the configuration file is for installing firmware.

* * * * *